2,880,038

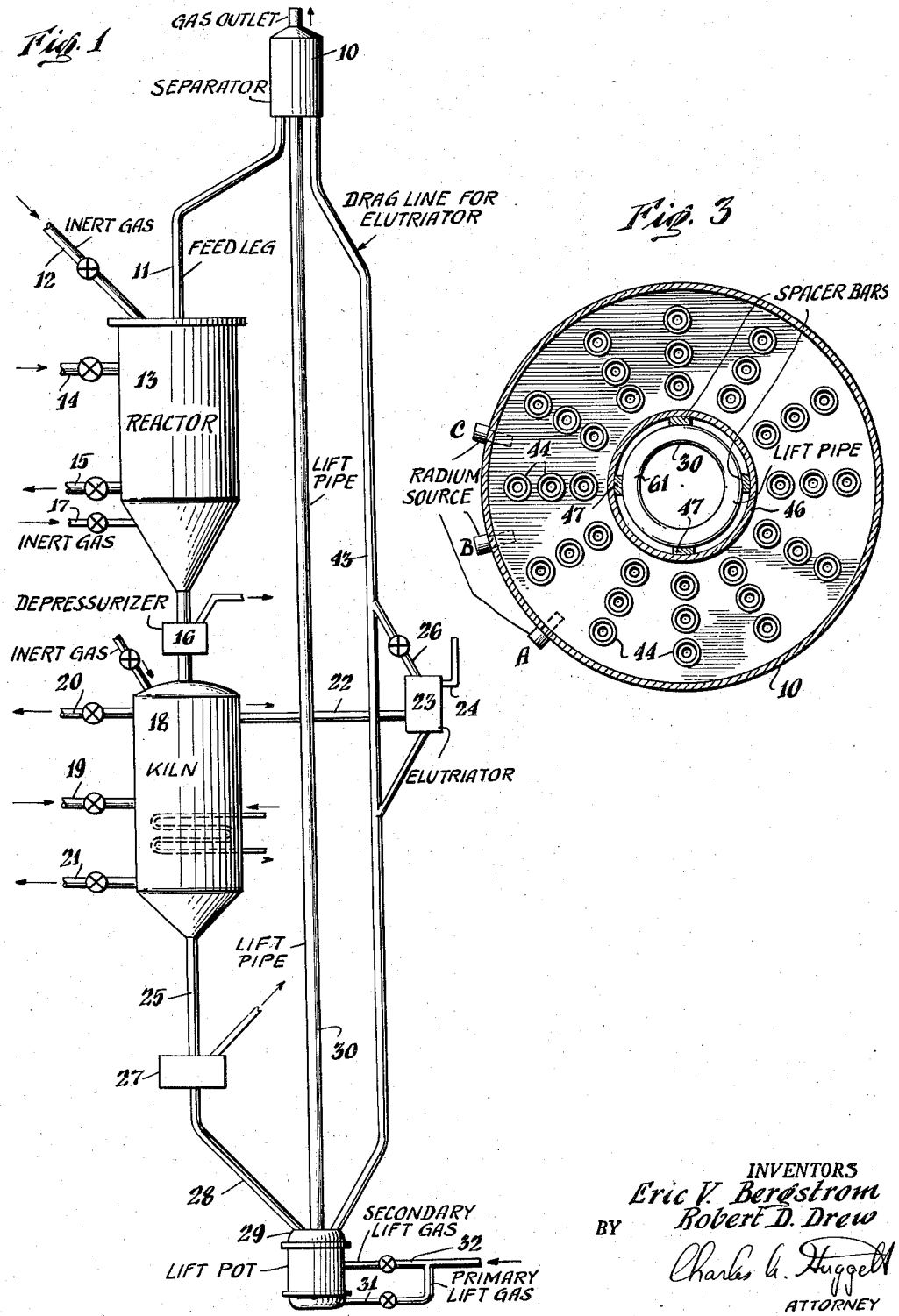

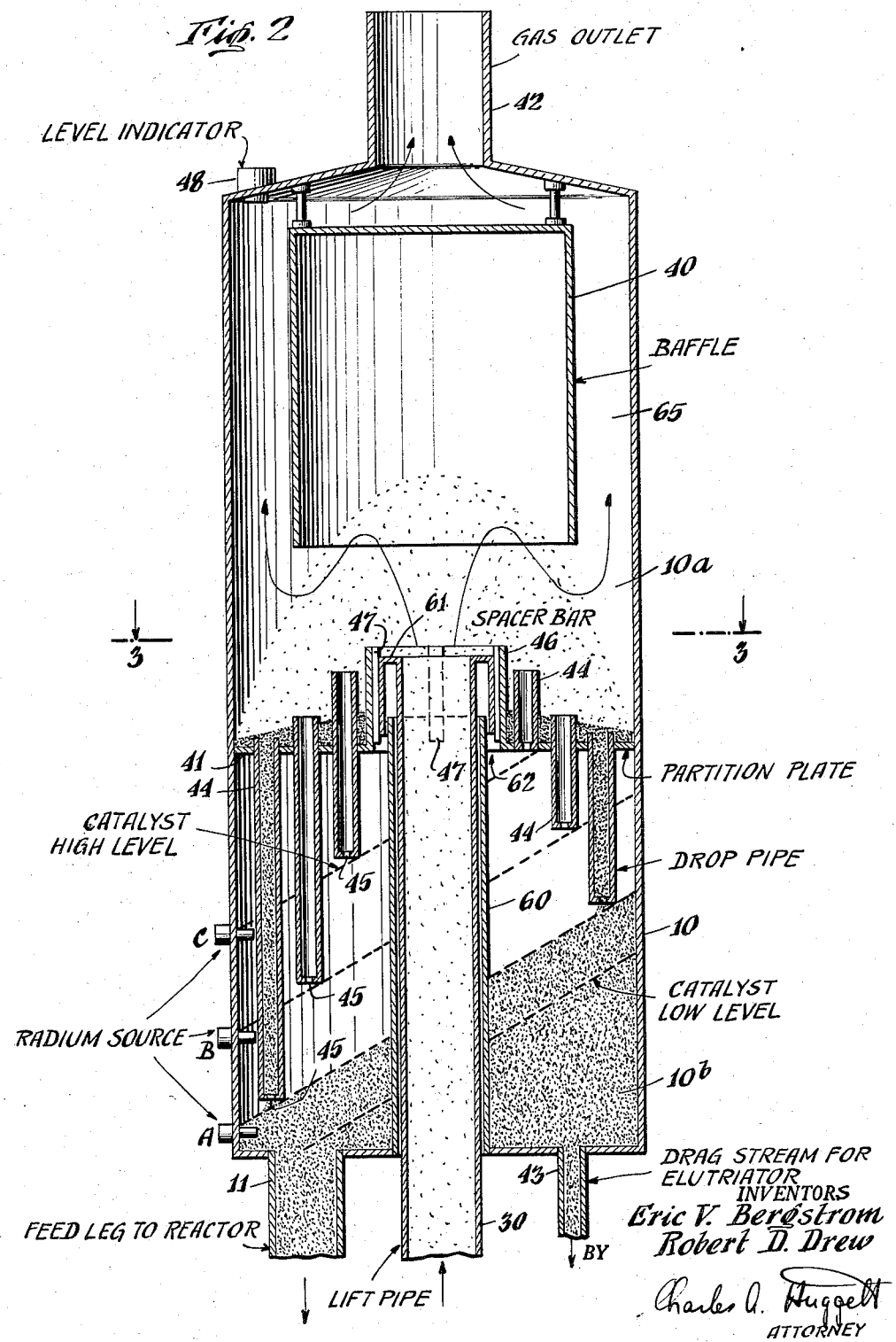

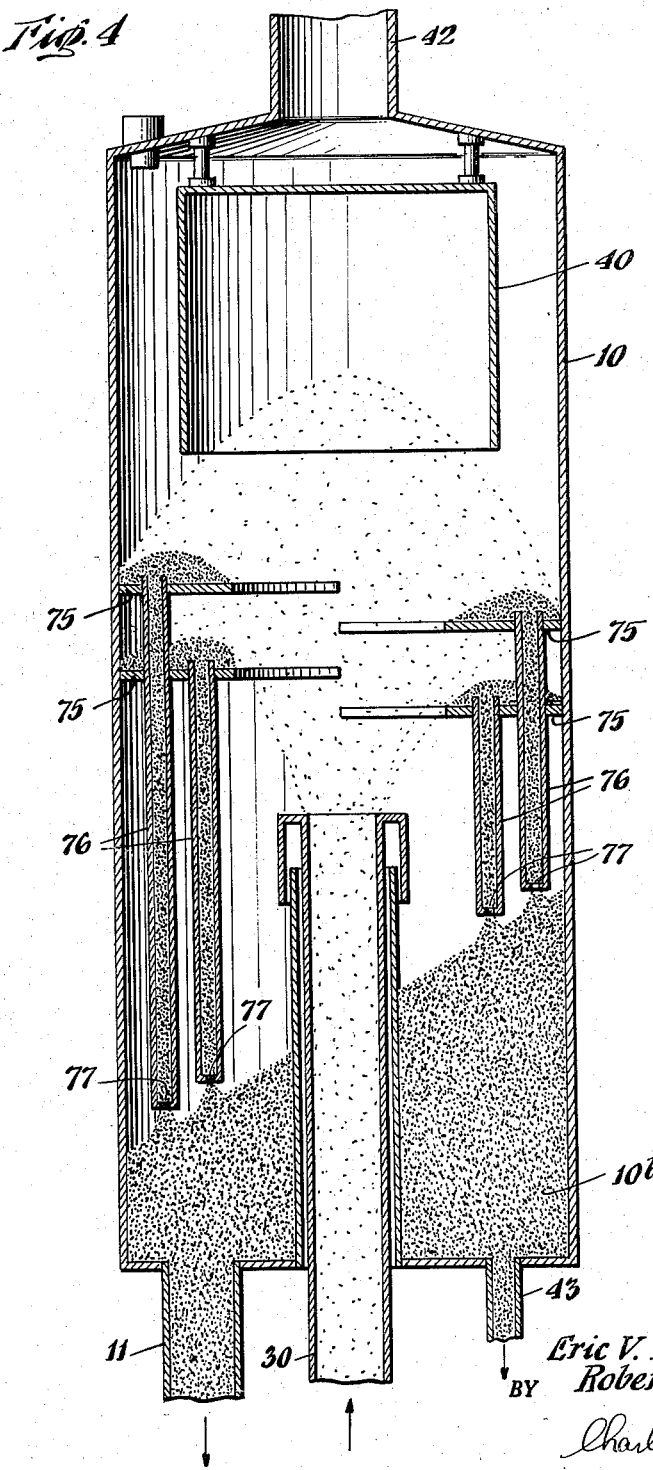

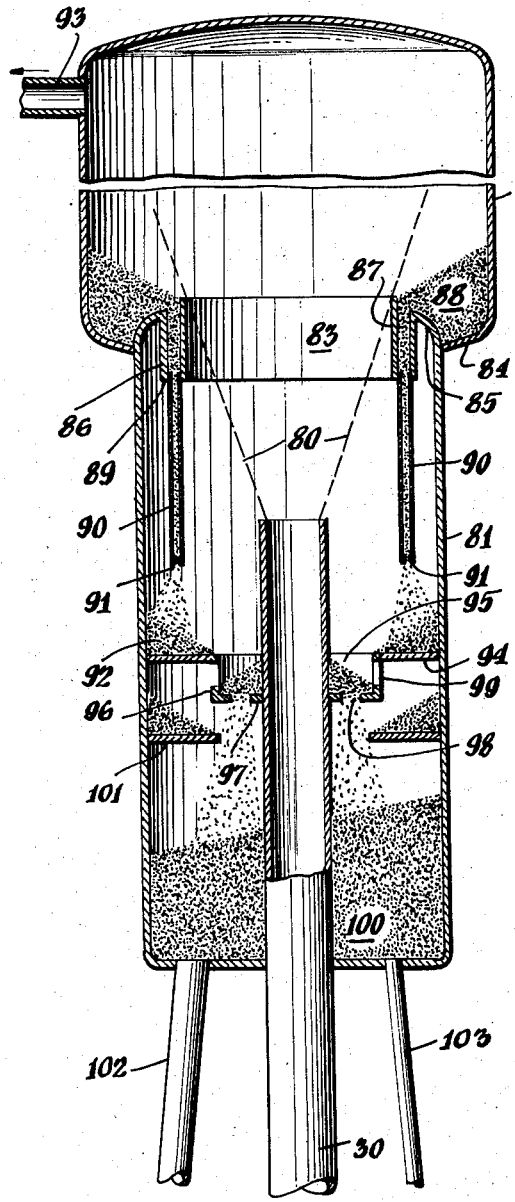
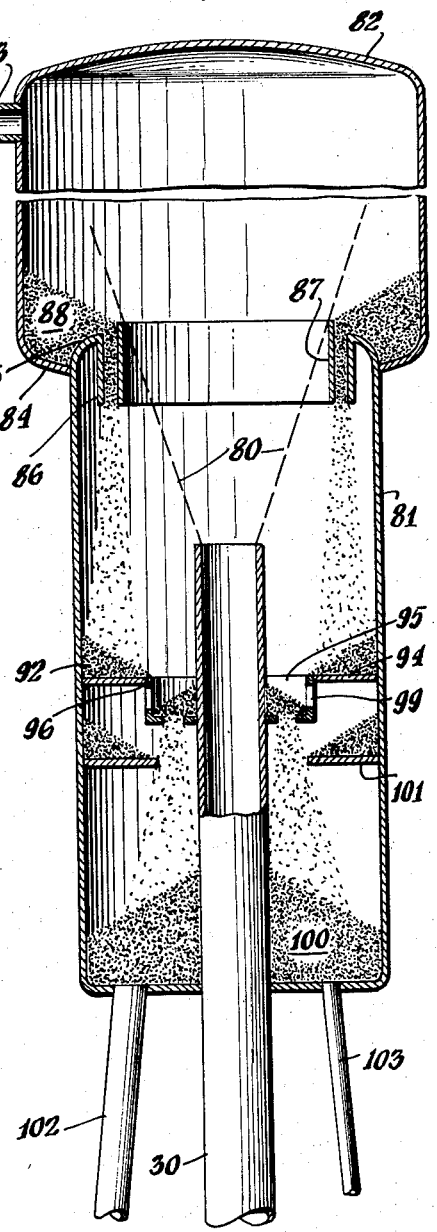

GAS SOLIDS SEPARATION IN A PNEUMATIC LIFT

Eric V. Bergstrom, Short Hills, and Robert D. Drew, Wenonah, N.J., assignors to Socony Mobil Oil Company, Inc., a corporation of New York Application December 22, 1953, Serial No. 399,746

18 Claims. (Cl. 302—59)

This application is directed to an improved method and apparatus for conveying upwardly granular contact material in a moving bed, hydrocarbon conversion system, and is more particularly concerned with the separation of gas and solids at the top of a pneumatic lift.

In the petroleum industry many processes are known in which hydrocarbons, at temperature and pressure suitable for conversion, are contacted with a granular solid material in the form of a gravitating column to produce converted products. In these processes, it is necessary to continuously remove the contact material from the bottom of the column and lift it upwardly to a location above the column to complete, eventually, an enclosed cyclic path. Recently, these systems are being modified to incorporate gas lifts, in place of the formerly used bucket elevators, as a means of raising the granular contact material.

Examples of various processes in this industry which necessitate the use of granular contact material are polymerization, isomerization, alkylation, hydrogenation, reforming, dehydrogenation, desulfurization and catalytic cracking. This invention will be described in relation to a catalytic cracking process, being understood, however, to apply broadly to any process or operation in which it is desired to lift a solid material in particle form with minimum particle attrition and erosion of metal. For example, it may be applied to conversion processes wherein hydrocarbons, prepared for conversion, are brought in contact with inert refractory particles, and converted products are removed therefrom. Typical of such processes is the production of ethylene from various gas oils at temperatures in the neighborhood of 1500° F.

In the moving bed system of catalytic cracking, the particles in granular form are contacted with suitably prepared hydrocarbons while gravitating downwardly through a reaction zone in the form of a substantially compacted column. The feed stock, usually a gas oil boiling somewhat above the gasoline boiling range, cracks in the presence of the catalyst, forming substantial amounts of hydrocarbons which do boil in the gasoline boiling range. Incident to the cracking operation, a deposit of carbonaceous material or coke is laid down on the surface of the catalyst, impairing its ability to function catalytically. The coked or spent catalyst is removed from the bottom of the reaction zone continuously and transferred to the top of a gravitating compact column of particles in a regeneration zone. The catalyst gravitating through the regeneration or reconditioning zone is contacted with a combustion supporting gas, such as air, to burn off the coke deposits from the surface of the catalyst. The coke-free or regenerated catalyst is withdrawn continuously from the bottom of the column in the regeneration zone and transferred to the top of the column in the reaction zone, completing the continuous path. This process involves the use of high temperatures and may involve the use of high pressures. For example, the reaction zone may be maintained at about 800–1100° F., suitable cracking temperature, and the regeneration zone may be maintained at about 1000–1300° F., suitable regeneration temperature. Although the cracking conversion is endothermic, whereas the regeneration is exothermic, the two reactions may or may not be in substantial balance. The catalyst is lifted, therefore, at temperatures of approximately 800–1200° F., or thereabouts.

As the catalyst material gravitates through the conversion zone, the gas or vapors contact the catalyst surface by passing through the voids between the particles. It is desirable to maintain the flow of gas through the bed uniform for a variety of reasons. For example, channeling of the gas through the reactor causes non-uniform deposition of carbon or coke upon the particles and non-uniform conversion of the reactant charge. The cracking efficiency is materially reduced from that which is obtained when the gas flows uniformly through the bed. Channelling in the regenerator causes the particles passing through the stream to overheat, thereby damaging the catalytic activity of these particles. Those particles not receiving their share of combustion supporting gas are not sufficiently regenerated to regain their former cracking activity. In order to provide uniform gas flow and prevent channelling, it is desirable to utilize catalyst particles of generally uniform size and shape, although some irregularity of size of particles is tolerable. For example, they may take the form of pellets, pills, uniform granules and spheres, spheres or beads being preferred. The term "granular" when used in this specification, refers broadly to all solid particles of the size range indicated, whether regular or irregular in size or shape. The particle size may range from about 3–100 mesh, Tyler screen analysis, and preferably 4–12 mesh Tyler. The catalytic material may be natural or treated clays such as bentonite, montmorillonite or kaolin, or may take the nature of certain synthetic associations of silica, alumina, silica and alumina, with or without various additions of metallic oxides. The particles may also be formed of inert materials such as, for example, mullite or corhart. These materials are well known in the petroleum and related arts, being produced in the form of hard refractory particles having enormous adsorptive surface area in relation to their small particle size. When inert materials are used, the particle size may be somewhat larger than 3 mesh Tyler. The particles have a density range of about 20–130 pounds per cu. ft., poured density. That is the density after the particles are poured into a receptacle. The hardness of these particles ranges from about 60–100 hardness index broadly, and 80–100 hardness index, preferred. The hardness index is determined by the following procedure: Clay catalyst—screen a sufficient quantity of catalyst which has been tempered at 1050° F. for 3 hours in substantially dry air atmosphere to obtain 80–100 cc. of particles which pass through a number 3 screen and remain on a number 5 screen. Transfer 80±2 cc. of the particles to an attrition can containing eight steel balls. Rotate the can with its axis in a horizontal position at 80±2 r.p.m. for one hour by means of the roller equipment specified below. Remove the sample from the can and screen over a number 6 screen, weighing the material retained on the screen to an accuracy of ±0.1 gram. The screenings are made by shaking for 10 minutes on a "Ro-tap" or "End-shak" shaking machine using eight inch test screens equipped with cover and pan.

Calculate the hardness index from the following formula:

$$\frac{\text{Weight on No. 6 screen} \times 100}{\text{Weight of No. 3 to No. 5 test sample}} = \text{Hardness index}$$

Special apparatus required:

"Ro-tap" or "End-shak" screen shaker.

Eight inch nested standard testing screens including cover and pan which conform to A.S.T.M. Designation: E11-39.

Attrition can—3½ in. diameter by 3¾ in. long, friction fit lid (i.e., 1 lb. standard grease can).

Eight steel balls, smooth surface, 15/16 in. dia.; 55±0.5 grams weight per ball.

Rotating machine adapted to rotate the can on its side at 80±2 r.p.m.

*Synthetic catalyst modification of procedure*

*Tempering.*—For silica-alumina cracking catalyst, temper for 10 hours in substantially dry air atmosphere at 1400° F.

For chrome-silica-alumina cracking catalyst, temper for 3 hours in substantially dry air atmosphere at 1100° F.

*Size of sample.*—Use 80±2 cc. of particles which pass through a number 3 screen and are retained on a number 8 screen.

*Rolling.*—Same as for clay.

*Rolled sample.*—Screen over a number 9 screen, weighing the material retained on the screen. The procedure followed is the same as for clay catalyst.

$$\text{Hardness index} = \frac{\text{Weight on No. 9 screen} \times 100}{\text{Weight of No. 3 to No. 5 test sample}}$$

Channelling may occur in these systems, even though uniform size particles are used, when catalyst attrition rates become excessive. Attrition involves the breaking or spalling of catalyst particles, usually encountered when the particles impinge on the metal walls of the enclosed system or against themselves, producing much smaller particles called catalyst fines. Fines are caused also by the fact that the particles rub against each other or the metal walls in transit. If the amount of fines in the system builds up too high, a number of difficulties arise, such as, for example, segregation and uneven distribution of fines in the moving beds which causes channelling, increase in pressure drop due to gas flow through the reactor, etc. Hence, catalyst attrition must be avoided or minimized in these moving bed systems.

Recently it has been found desirable to effect transfer of catalyst from one elevation to the other in these cyclic systems by means of pneumatic lifts which replace mechanical elevators formerly employed for this purpose. Unfortunately, initial attempts to transfer catalyst with pneumatic lifts resulted in excessively high catalyst attrition and breakage losses to an extent that made the use of such lifts unfeasible. It has now been discovered that these high attrition losses are cumulative losses from several parts of the pneumatic transfer system. One portion of this system found to cause high catalyst attrition and breakage is that portion wherein the catalyst is separated from the lift gas and caught at the upper end of the pneumatic lift system. While this invention in one form involves an improved cyclic conversion system and an improved pneumatic transfer system as combinations, still in a board form the invention is particularly concerned with the lift gas-catalyst separation system and the combination thereof with the pneumatic lift.

A major object of this invention is the provision in a cyclic process for conversion of hydrocarbons in the presence of a granular contact material of an improved method and apparatus for transferring the catalyst from one elevation to a higher elevation and for collecting the transferred contact material without excessive attrition or breakage thereof.

Another object is the provision of an improved method and apparatus for pneumatic transfer of granular solids.

A further object is the provision of improved method and apparatus for separating granular solid contact material from a lift gas in which it is suspended after issuance of the material and gas from the upper end of a vertically extending pneumatic lift pipe.

A further object of the invention is the provision of an improved separator for use at the upper end of a pneumatic lift pipe to permit separation of lift gas and suspended granular solid contact material with minimum attrition.

A specific object is the provision in a pneumatic transfer system of an improved method and apparatus for separating the transferred granular material from the carrier gas and for the collection of the separated material without excessive attrition and breakage thereof.

These and other objects of the invention will be made apparent by the following sketches, all highly diagrammatic in form, and the subsequent discussion of the process and apparatus.

Figure 1 shows a continuous moving bed hydrocarbon conversion system incorporating a gas lift as the contact material lifting means.

Figure 2 shows a vertical elevation, in section, of the separator located atop the gas lift.

Figure 3 shows a plan view in horizontal section of the separator as seen on plane 3—3 of Figure 2.

Figure 4 shows an alternate separator atop the gas lift.

Figure 6 shows a vertical elevation, in section, of a separator located atop the gas lift.

Figure 7 shows a vertical elevation, in section, of a separator located atop the gas lift.

Figure 5:
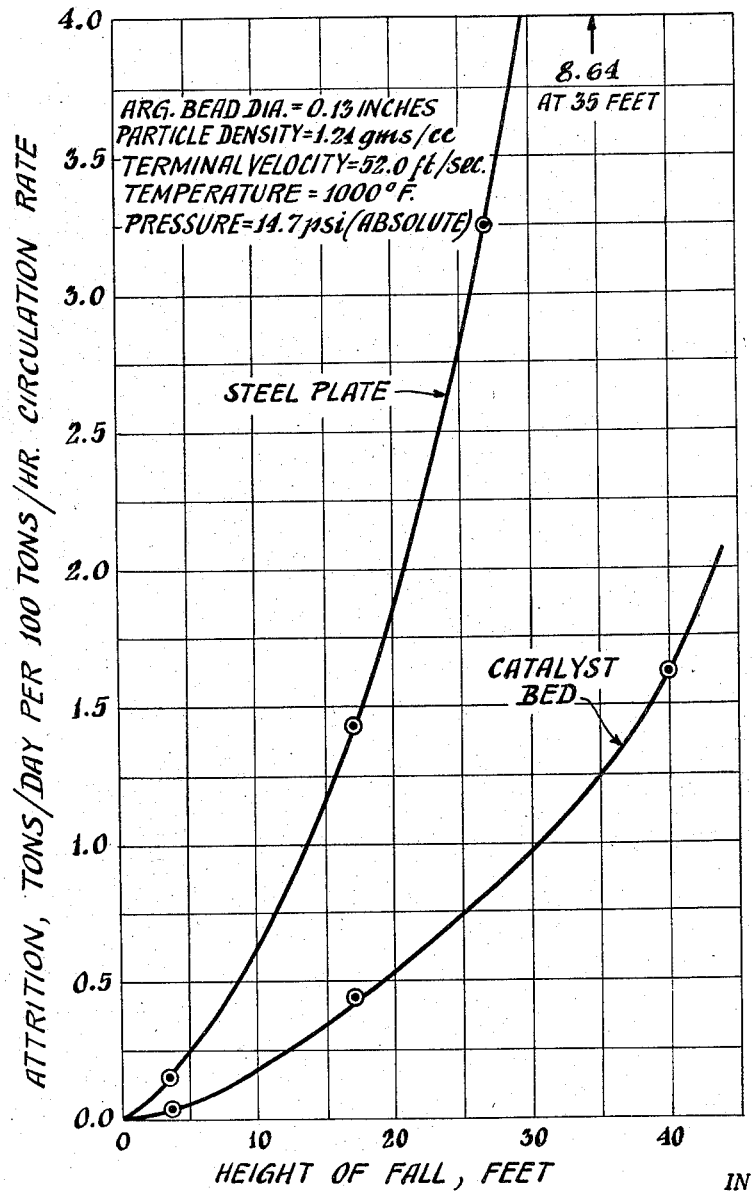
Figure 5 shows the effect of height of fall on catalyst attrition.

Referring now to Figure 1, a complete hydrocarbon conversion system is illustrated. A separator surge vessel 10 is provided which is large enough to serve in a dual capacity, both as a separating or settling means for separating catalyst from lift gas and as a surge hopper to allow for irregularities in catalyst flow through the moving bed system. The conduit 11 serves as an elongated feed leg to transfer the catalyst from the surge hopper 10 into the reaction vessel 13. The reaction vessel may be operated at a pressure which is higher than that of the separator, i.e. 5-30 p.s.i. (gauge), and the catalyst will feed into the vessel through the conduit 11 without valves or restrictions, provided the leg is suitably shaped and sufficiently long. The feed leg must be substantially vertical, thereby requiring a taller gas lift when the pressure differential is increased. A suitable feed leg is shown and claimed in United States Patent 2,410,309.

The catalyst is gravitated through the reactor 13 as a substantially compacted column and contacted therein with hydrocarbons, suitably prepared for reaction, introduced through the conduit 14. The reactants may be in liquid, vapor or mixed liquid and vapor form, preheated, generally, to about 700–800° F., although higher or lower temperature may, in certain instances, be used, depending, to some extent, upon the type of charging stock. The hydrocarbons are converted in the vessel upon contacting the catalyst to more desirable materials and the products are removed from the vessel through the conduit 15 to fractionation and processing apparatus, not shown. The spent catalyst is withdrawn continuously from the bottom of the vessel and introduced into a depressurizer 16, usually, where the pressure is reduced practically to atmospheric. This is done, primarily, because it is simpler and more economical to regenerate or restore the material at substantially atmospheric pressure. A suitable depressurizer is shown and claimed in U.S. Patent No. 2,448,272, which issued on August 31, 1948. Inert gas is introduced into the top of the vessel 13 through conduit 12 and bottom of the vessel 13 through conduit 17, to act as a sealing medium in preventing the escape of reactant fluids from the vessel.

The depressurized catalyst is gravitated downwardly as a compact column through the regenerator or kiln 18 wherein it is contacted with combustion supporting gas and the coke deposits are burned. The catalyst may enter the vessel at a temperature in the neighborhood of 800–900° F., and be removed therefrom at a temperature in the neighborhood of about 1100–1300° F. Temperatures higher than the above heat damage the catalyst, impairing its catalytic activity. Where only a heat carrying medium is required, however, inert refractory particles, such as corhart or mullite, may be used and restored at temperatures well in excess of the above without damage. In order to control the temperature of the kiln, cooling coils may be utilized. Air is introduced into the kiln 18 through the conduit 19 and travels both upwardly and downwardly through the bed, being withdrawn through the conduits 20, 21. A stream of flue gas is taken from the kiln 18 through the conduit 22 to the elutriator 23 located in the catalyst line 26. Fines are removed with the flue gas through the conduit 24 to separation apparatus, not shown, wherein the fines are removed from the gas.

The catalyst is withdrawn from the bottom of the kiln through the conduit 25. The catalyst is depressurized, if necessary, in the vessel 27, which also provides an outlet for lift gas which passes upwardly through the catalyst column in the conduit 28. The catalyst is gravitated downwardly through the conduit 28, which may be a suitably shaped feed leg similar to the reactor feed leg 11, into the top of the lift pot 29. The lift pipe 30 is a suitably elongated substantially vertical tube, preferably of circular cross-section, although other shapes may be utilized. The lift pot 29 is located at the bottom of the pipe and the separator 10 is located at the top of the pipe with the ends of the pipe projected into each vessel. The granular material forms a compact mass of particles around the lower end of the lift pipe 30. Primary lift gas is introduced into the bottom of the lift pot through the conduit 31. The gas is discharged upwardly from a conduit which terminates just below the bottom end of the lift pipe, whereby the primary gas passes directly up the tube without passing through any substantial bed of catalyst. Secondary gas is introduced through the conduit 32 into the lift pot in such a manner that it passes through regions normally occupied by the catalyst bed, when no gas is flowing through the lift, prior to its introduction into the lift pipe. The catalyst flow through the lift pipe can be readily controlled by controlling the secondary lift gas stream. Such a lift pot design is shown and claimed in co-pending application Serial No. 211,258, filed February 16, 1951.

In this arrangement the contact material is gravitated downwardly from the separator or settling-surge vessel through the contacting vessel to the feeding vessel as a continuous unobstructed stream. Since the rate of downward movement of contact material can be controlled by adjustment of the rate of secondary lift gas supply, no valve or lock systems are required in the catalyst flow conduits. Inasmuch as such devices cause catalyst attrition as well as mechanical troubles at the elevated temperatures involved, their elimination from the system is an important improvement.

The granular material is discharged from the upper end of the lift pipe 30 into the vessel 10 at a level intermediate the upper and lower ends thereof. The settling surge vessel 10 is shown in more detail in Figures 2 and 3 which should be read together. A horizontal partition plate 41 extends across the vessel 10 so as to divide it into an upper settling chamber 10a and a lower surge chamber 10b. A vertical sleeve 60 extends upwardly from the bottom of the chamber 10b through a circular opening in partition 41 and terminates shortly above the partition. A vertical ring 46 is connected tightly into the circular opening in partition 41 and extends upwardly to a level a short distance (about 2½ feet in one example) above the partition 41. The ring baffle forms the effective upper end of the lift pipe 30 which extends up through the sleeve 60 to a level slightly above the upper end thereof. A collar or channel-shaped lip is connected to the upper end of the lift pipe and is sized to overlap the sleeve 60 so as to prevent escape of granular material between the sleeve and the lift pipe. An annular opening 62 through the partition 41 remains between the concentrically arranged lip 61 and ring member 46. Spacer bars 47 are arranged at intervals around the opening and between members 46 and 61. A plurality of pipes arranged in ring groups concentric with the lift pipe extend through the partition 41. The pipes 44 in the outer ring group drop to the lowest level, terminating on their lower ends along a plane spaced above the bottom of the surge chamber 10b and sloping upwardly from the side of the chamber nearest the feed leg 11 (which connects off center into the bottom of chamber 10b for catalyst withdrawal therefrom) to the opposite side of the chamber 10b. The pipes 44 in the middle ring group terminate at equal distances above the same plane but at a higher level and the pipes in the inner ring group terminate at equal distances above the same plane at a still higher level in the surge hopper 10b. In other words, the drop pipes in any ring group terminate at their lower ends in a plane which slopes downwardly from the lower end of the drop pipe in the ring group located furthest away and on the opposite side of the hopper from the feed leg, toward the longest drop pipe in that ring group which is located on the same side of the hopper as the feed leg 11 and nearest the feed leg entrance. While as in this example the pipes of any group terminate in a flat plane, in a preferred form of this invention they may terminate at equal distances from an imaginary conical surface formed as the locus of revolution around the axis of the leg 11 of an imaginary line having one end fixed at the center of leg 11 at the level of the bottom of surge chamber 10b and sloping upwardly from that point at the angle of repose of the catalyst involved. This angle may vary from 25 to 45 degrees depending upon the particular catalyst but usually an angle of about 30 degrees with the horizontal is satisfactory. The pipes in each ring group should preferably be equidistant from this conical surface and the corresponding pipes in the several groups should, of course, terminate at different vertical distances above the plane in surge chamber 10b. This latter arrangement applies whether the catalyst outlet from the surge chamber is positioned off center as shown or centrally. It also applies where there are two or more catalyst outlets. In the latter case, there will be a similar imaginary cone for each outlet and the pipes in any group are arranged at equal distances above the cone corresponding to the outlet served by those pipes. Also those pipes located vertically in line with the intersection of the imaginary cones will have their lower terminus determined on the basis of the level of the lines of intersection of the cones.

Returning to Figures 2 and 3, the upper ends of the drop pipes 44 in each ring group terminate in a common horizontal plane above the partition 41, but the several ring groups terminate at different levels above the partition. The pipes in the group extending to the lowest sloping plane level above the bottom of surge chamber 10b terminate the shortest distance above the partition 41. The pipes in the group having lower ends spaced at a plane level furthest above the bottom of the chamber 10b terminate at the highest level above the partition 41. In general, the pipes are so arranged at their upper ends that a line connecting the upper end of any drop pipe with the nearest pipe in the adjacent ring will at least form an angle with the horizontal greater than the angle of repose of the catalyst. This varies from 25–45 degrees but, for most cases an angle of about 40–45 degrees will be found satisfactory. For convenience, the upper ends of the drop pipes are terminated in a right conical surface having its axis substantially concomitant with the lift pipe axis and having an apex angle of about 90 degrees.

A gas outlet 42 connects centrally into the top of vessel 10. A cylindrical skirt 40, closed on its upper end, is supported a spaced distance below the upper end of the vessel 10 and centrally of its cross-section. The skirt 40 is of smaller diameter than vessel 10 so as to leave an annular passage 65 between the skirt and the vessel 10 through which gas may flow to the outlet 42.

In operation the granular material suspended in lift gas discharges upwardly into the settling chamber 10a where the stream is laterally expanded due to the larger cross-section of chamber 10a as compared with lift pipe 30. As a result the upward catalyst velocity is rapidly decelerated and the catalyst granules settle onto the partition 41. The lift gas escapes through passage 65 to outlet 42. Preferably, the annular passage should be of such cross-sectional area as to cause a gas velocity in the passage 65 which will permit entrainment of fines, i.e., material smaller than about 100 mesh Tyler, while larger particles settle. Thus, a preliminary elutriation is accomplished in passage 65. The granular material forms a pile on partition 41 which slopes upwardly at the angle of repose from the ring group of drop pipes in use. The catalyst flows through the drop pipes, as will be described below, as substantially compact throttled streams and drops onto the surface of a bed of catalyst maintained in the surge chamber 10b.

Throttling orifice discs 45 are placed in the lower end of each pipe to substantially throttle the downward flow of catalyst through the drop pipes below that corresponding to free flow. The catalyst pile on the partition plate 41 builds up to the level of the outer ring of pipes 44 and spills into the pipes, rapidly forming a compact column therein because of the restricted outlets. The orifices in the discs 45 are sized to permit gravitation therethrough of somewhat less than the normal catalyst flow. For example, it is preferred that the outlet of each ring of pipes be restricted to handle between 50–90 percent of the total normal catalyst flow and preferably 80–85 percent of the flow. Consequently, the level of the catalyst on the partition plate 41 rises to permit the remainder of the catalyst to flow through the next inner ring of pipes. For example, 85 percent of the catalyst may flow through the outer ring of pipes as shown when the surface of the catalyst in the bottom of the vessel 10 is below the lower ends of the outer ring of pipes and 15 percent of the catalyst may then be flowing through the intermediate ring of pipes. Because the outlets of the pipes are restricted, the catalyst passing through the intermediate ring of pipes hangs up momentarily at the outlets. This provides, in essence, two relatively short free-fall drops for this small portion of the flowing catalyst. The bulk of the catalyst, passing through the outer ring of drop pipes, has only the relatively short free-fall from the lower ends of the drop pipes to the surface of the catalyst. The amount of this free drop may be limited as desired by using less or more rings of drop pipes 44 at spaced levels within the surge chamber. When the catalyst level in the surge chamber rises up to or above the lower ends of the outer ring of drop pipes, the flow from these pipes is substantially reduced because the outlets are blocked by the catalyst bed, except to the extent of the downward movement of catalyst in the bed in the projected area directly below the orifice 45. The flow through the intermediate ring then increases to capacity, for example, 80–85 percent of the total flow. The level of the catalyst pile increases, allowing the excess catalyst to pass through the inner ring of drop pipes, resulting in a stable operating condition until the level in the surge chamber rises to the bottom of the intermediate ring of pipes. When the lower ends of the intermediate ring of pipes are covered with catalyst, substantially all the catalyst flow is diverted to the inner ring of pipes.

The lower ends of the pipes are terminated in spaced apart surfaces so located that substantially all the flow of catalyst is downwardly in compact column form to release apertures located just above the surface of the bed of catalyst in the surge zone. The remainder of the flow, which passes through the next ring, is released from outlets located near the surface of the bed. These paths which terminate at the bottom a substantial distance above the bed receive practically none of the catalyst flow because their upper ends project above the surface of the pile of catalyst on the partition plate. If the level of catalyst on plate 41 builds up to an extent where the inner ring group of pipes cannot prevent further bed level increase, then the excess catalyst overflows through the safety overflow opening 62. The ring baffle 46 is in essence a single drop pipe and hence, the upper end of the baffle should be so positioned that a line connecting the upper end of any of the inner drop pipes with the nearest point on the upper edge of the baffle slopes at an angle greater than the angle of repose of the contact material, a 40–45 degree slope being satisfactory in most cases.

A level indicator is used to indicate the catalyst level in the surge chamber. Although several indicators are known in the art, the indicator illustrated uses radium sources A, B and C to emanate waves to a receiver 48. The catalyst blocks, at least in part, the transfer of energy from the sender to the receiver, giving a simple, accurate level indicator when the unit is properly calibrated.

It will be understood that the apparatus is, within the scope of this invention, subject to considerable modification from the form specifically disclosed hereinabove. For example, the partition 41 may take a form other than a flat plate. Thus, it may be concave in shape or even conical in shape. In place of the pipes rectangular ducts or members adapted to provide concentrically arranged annular shaped passages may be substituted provided the ends of these members are designed to terminate at the proper levels. The overflow passage 62 and the sleeve 60 and ring members 46 may be omitted where thermal expansion problems are not serious. The arrangement of the gas outlet and baffle 40 may also be modified. Thus, for example, the outlet 42 may be connected into the side of vessel 10 near its upper end and skirt 40 may depend from the top of vessel 10. Also, other forms of baffle member may be interposed in the direct line of flow between the upper end of the lift pipe and the separator gas outlet for the purpose of forcing the gas to take a circuitous route before reaching the gas outlet.

Where the catalyst discharge velocity at the upper end of the lift pipe is low, it is satisfactory to catch the catalyst on a bed of the catalyst maintained just below the top of the lift pipe, or at least not above about 3 feet below the top of the pipe. However, when large diameter lift pipes are used, it is difficult to maintain the catalyst discharge velocity low, without danger of surging in the lift pipe. In these situations, it is more advantageous to catch the catalyst at some level above the top of the lift pipe and let it down gently from that elevated level to the bed of catalyst maintained about the lift pipe in the lower portion of the separator.

Figure 4 shows an arrangement with shelves at spaced levels along the vertical length of the separator. The shelves 75 are in the form of horizontal sectors of annular rings located on alternate sides of the inner periphery of the vessel 10 at spaced levels above the upper end of the lift pipe 30. The shelves can be arranged in a series which extend below the top of the lift pipe, if desired. Below the top of the lift pipe, horizontal plate or partitions can be used which extend all across the separator, whereas above the top of the pipe the inner edges of the shelves must be spaced away from the extension of the centerline of the lift pipe an amount sufficient to prevent the catalyst from impinging on the underside of the shelf in its upward flight. The catalyst discharges from the upper end of the pipe in the form of a fountain or inverted cone and, therefore, the higher shelves must be spaced back from the lift pipe centerline an increased amount to avoid interference with the rising catalyst. The catalyst particles are preferably caught on the shelves near the upper end of their travel, forming a pile of catalyst thereon. The major portion of this catalyst is gravitated downwardly through the drop pipes 76 to a discharge level just above the level of the bed 10b in the bottom of the vessel. The orifice plates 77 in the bottom ends of the drop pipes 76 are sized to maintain the solids in the drop pipes 75 in substantially compact columnar form. The gas is withdrawn from the top of the vessel between the baffle 40 and the vessel walls and then discharged through the conduit 42. In place of the drop pipes 76 the catalyst may be allowed to drop through orifices in the trays or shelves down to the next lower shelf, so that the catalyst particles fall only a short distance before being caught on the next lower shelf. In this manner, the particle velocity does not build up to a high enough velocity to fracture. Alternatively, these shelves can be arranged so that the lower shelves extend inwardly a greater amount than the upper shelves, in the form of stairs. By this arrangement, the catalyst can cascade over the edge of the shelf down to the next lower shelf with the shelves placed close enough together to prevent the particle velocity from building up to the fracturing velocity. All of these schemes involve the steps of catching the catalyst at some level where its velocity is reasonably low and then impeding the downward movement of the catalyst in some way so that it moves downwardly toward the bed of catalyst in the lower section of the separator at a velocity which is low enough to prevent fracture of the particles.

Figure 5 shows a plot of catalyst attrition versus height of fall both for catalyst falling on catalyst and catalyst falling on steel plates. It is seen that if the height of free-fall of the catalyst is kept below about 5 feet and the catalyst falls on catalyst, substantially no attrition or breakage occurs. On the other hand, if the catalyst falls 30 feet onto a bed of catalyst as much as 1 ton a day breakage occurs for a circulation rate of 100 tons per hour.

It will be noted that by the method of this invention a stream of contact material and suspending carrier gas from a lift pipe is caused to laterally expand in the settling chamber whereby the upward velocity rapidly decreases and the granular contact material begins to drop within the settling chamber. A positive hindrance is imposed to the fall of at least a substantial portion of and preferably most of the contact material throughout a substantial portion of the vertical distance between the level where the drop begins and the bed of material in the surge chamber below. For example, as shown in Figure 2, the granular solids pass down through pipes 44 at a rate throttled by orifices 45 so that the flow is as a compact stream. As a result, the granules fall onto the surface of the bed in the surge zone with substantially less force than would be the case if the material were permitted to fall freely the entire distance. While usually the imposition of an impedance on the free-fall of the granules from a level shortly below the upper end of the lift pipe to a level shortly above the bed in chamber 10b is sufficient to restrict attrition and breakage to a feasible minimum, nevertheless, if desired, the fall of the material may be impeded throughout much of the distance between the upper end of the lift pipe and the highest level of material upward travel in chamber 10a. The shelves need not be horizontal, but should be so shaped that a bed of catalyst is maintained on the shelves. By this expedient, the catalyst will fall on catalyst rather than metal, shown by Figure 5 to be better from an attrition standpoint.

In order to further restrict catalyst attrition at the upper end of the lift pipe, the velocity of the catalyst discharged upwardly therefrom may be limited. This will restrict the height to which the catalyst rises above the partition 41. It has been found that substantial reduction of attrition may be insured by limiting the average catalyst velocity at the upper end of the lift between about 5–35 feet per second and preferably within the range 10–25 feet per second. This velocity reduction may be effected by using a suitably tapered pipe, which allows the gas velocity to reduce in the upper portion of the lift pipe with a consequent deceleration of the catalyst particles. This may also be accomplished by withdrawing gas through withdrawal conduits at spaced locations along the upper portion of the lift pipe. These features are shown in more detail and claimed in copending applications for Letters Patent Serial Number 210,942, filed February 4, 1951, and Serial Number 211,344, filed February 16, 1951. As indicated in these cases, a catalyst velocity in the lower portion of the pipe which may be higher than that desired at the top is essential to prevent high catalyst attrition in the lift pipe and inefficient operation of the lift. It will be understood that the present invention is not restricted in its broader aspects to reduction of the catalyst velocity at the top of the lift in the manner above discussed, but operation in that manner is preferred. In general, it is preferable also to provide sufficient impedance to the catalyst drop to prevent its striking the bed surface in the surge zone at a velocity in excess of about 34 feet per second. The catalyst density in the lift pipe is preferably about 1–3 pounds per cu. ft. but broadly may be in the range of 0.5–15 pounds per cubic foot.

The following is an example of a typical commercial application of this invention:

In a moving bed cracking system having a nominal catalyst circulation rate of 360 tons/hr., synthetic Silica-Alumina-Chromia beads of approximately 1/8–1/4 in. diameter and about 85 Hardness Index, and cracking capacity of 10,000–15,000 bbls. per stream day, the following dimensions are satisfactory for the apparatus:

| | |
|---|---|
| Lift pipe height | 237 ft. |
| Lift pipe internal diameter at bottom | 25.6 in. |
| Lift pipe internal diameter at top | 42.31 in. |
| Separator height | 35 ft. 2 in. |
| Separator inside diameter | 14 ft. |
| Distance lift pipe projects into separator | 17 ft. 1.25 in. |
| Location of partition plate above bottom of separator | 16 ft. 2.5 in. |
| Inside diameter of ring barrier | 52.31 in. |
| Number of pipes in each ring | 12. |
| Diameter of outer ring | 12 ft. |
| Diameter of intermediate ring | 10 ft. |
| Diameter of inner ring | 8 ft. |
| Nominal diameter of drop pipes | 8 in. |
| Diameter of discharge orifice in drop pipes | 4.5 in. |
| Distance outer ring projects above partition plate | 1 in. |
| Distance intermediate ring projects above partition plate | 1 ft. 4 in. |
| Distance inner ring projects above partition plate | 2 ft. 6 in. |
| Distance barrier projects above partition plate | 3 ft. |
| Distance shortest pipe in outer ring projects below partition plate | 5 ft. 6 in. |
| Distance shortest pipe in intermediate ring projects below partition plate | 3 ft. |
| Distance shortest pipe in inner ring projects below partition plate | 4 in. |

| | |
|---|---|
| Angle formed by the intersection of the plane which contacts the lower end of each drop pipe in each ring and the horizontal plane | 30 degrees. |
| Withdrawal aperture diameter | Approx. 15 in. |
| Location of withdrawal aperture | Substantially below the longest drop pipe in the outer ring — 5 ft. 2.5 in. from the center of the lift pipe. |
| Nominal flow through withdrawal aperture | 350 tons/hr. |
| Nominal flow withdrawn for elutriator drag stream | 10 tons/hr. |

Referring now to Figure 6, an alternate arrangement is shown. Catalyst is discharged upwardly in the form of an inverted cone from the upper end of the lift pipe 30. The cone of the catalyst is indicated generally by the dotted lines 80, 80. The separator is formed by combining two vessels 81, 82. The upper vessel 82 has a larger diameter than the lower vessel 81 because the stream of catalyst expands laterally and it is desirable that the vessel be of sufficient cross-section to prevent hard contact of the catalyst against the wall of the vessel. A hole 83 is located in the top of the vessel 81, to permit the catalyst stream to enter the upper vessel 82. A shelf is formed at the bottom of the upper vessel by the bottom portion 84 of the upper vessel and the portion of the top 85 of the lower vessel. This shelf retains a bed of catalyst on which the particles are caught. A cylindrical baffle 86 is located about the hole 83, and an inner cylindrical baffle 87 is located concentric with the outer baffle 86, providing an annular passage for the movement of catalyst from the shelf 88. A floor 89 is located at the bottom of the two cylindrical baffles 86 and 87, and depending from this floor 89 is a ring of drop pipes 90. These drop pipes terminate at a level below the upper end of the lift pipe. Orifice plates 91 are located in the lower ends of the drop pipes 90 to maintain the catalyst in the pipes in compact form. The catalyst is discharged from the bottom of the drop pipes falling freely to the bed 92 located just below the lower end of the pipes. The gas is discharged free of catalyst from the outlet 93 in the upper vessel 82. The orifice plates 91 are sized to handle slightly less than the normal catalyst flow so that the catalyst is lowered from the shelf 88 in compact form. The excess flows over the baffle 87 and drops freely to the bed 92.

A horizontal partition 94 is located a short distance below the top of the lift pipe 30 to provide a support for the bed of catalyst 92. In the central portion of this plate is located a depressed partition or well 95 formed by cylindrical member 96 and circular member 97. A plurality of orifices 98 are located in the member 97 to permit direct transfer of a portion of the catalyst flow to the bed 100 therebelow. Vertical slots 99 are located about the cylindrical member 96 to permit the remainder of the catalyst to pass through the partition 94. The vertical slots 99 meter the flow of catalyst, thereby maintaining a bed of catalyst in the well 95 of variable height depending upon the flow rate of the catalyst. By observing or measuring the height of catalyst in the well, it is possible to determine the flow rate of the catalyst. A baffle 101 is located horizontally a short distance below the partition 94, for example about 3 feet, to catch the particles issuing from the slots 99. The particles then spill over the inner edge of the baffle 101 into the central portion of the vessel 80 and are caught on the bed 100 in the bottom of the vessel. Catalyst is withdrawn continuously from the bottom of the vessel through the pipes 102 and 103.

Figure 7 shows a construction similar to that illustrated on Figure 6 with the exception that the drop pipes 90 and floor 89 have been eliminated. The catalyst pours over the edge of the shelf 88 between the cylindrical baffles 86 and 87 to fall freely outside the rising cone of catalyst to the bed 92 located therebelow. This example illustrates catching the catalyst outside the rising cone of catalyst and letting it down as a series of free-fall drops to the bed surface below the top of the lift pipe. The descent of the catalyst is hindered by the plurality of shelves located outside the stream of rising catalyst. The shelves are preferably located close enough together so that no drop exceeds about 5 feet, although any reduction in the length of the free-fall drop of the catalyst is helpful in reducing or preventing attrition or breakage of the catalyst. The shelves can be of any desired or suitable shape in order that a ledge is provided on which catalyst can fall. It is preferable that the shelf be so arranged that a bed of catalyst is maintained thereon to cushion the shock of the falling catalyst.

It will be understood that the invention is not intended to be restricted to the specific examples of structure, or operation and application given hereinbefore and it is intended to cover all changes and modifications of the examples of the invention herein chosen for purposes of disclosure which do not constitute departures from the spirit and scope of the invention.

This application is a C.I.P. of previously filed application Serial Number 211,238, filed February 16, 1951, now abandoned.

We claim:

1. An improved method for pneumatic transfer of a granular contact material from one level to a second higher level which comprises: maintaining a bed of said contact material at said higher level, mixing the contact material to be transported with a lift gas at the lower level to effect its suspension therein, passing the contact material suspended in said lift gas upwardly as a laterally confined stream to a discharge level within a confined settling zone, which level is a substantial distance above the surface of said bed, permitting the stream to laterally expand in said settling zone, whereby its upward velocity is greatly decreased and the contact material begins to settle, catching the falling granules on a surface only a short distance below said discharge level and then causing at least most of the contact material to gravitate downwardly as at least one throttled substantially compact stream substantially the entire distance down to the surface of said bed, whereby the contact material is delivered onto said bed with a force substantially less than would be the case if it were permitted to fall freely from said discharge level onto said bed.

2. An improved method for lifting granular solid material which comprises: gravitating a substantially compact column of granular material into a feeding zone to form a substantially compact bed therein, introducing a lift gas into the feeding zone to effect suspension of the granular material, transferring the material in suspension upwardly through a confined lift passage, discharging the suspended material upwardly from the upper end of the lift passage into a receiving zone of substantially larger horizontal cross-sectional area than said lift passage, whereby the contact material upward velocity is rapidly decreased to the point where the contact material falls downwardly within said receiving zone, collecting the descending granular material on the surface of a gravitating bed of granular material near the top of the lift passage, maintaining the level of the gravitating bed constantly only a short distance below the upper end of the lift passage, and separately withdrawing the lift gas from an upper portion of said receiving zone.

3. An improved method for lifting granular solid material which comprises: gravitating a substantially compacted column of granular material into a feeding zone to form a substantially compact bed therein, introducing a lift gas into the feeding zone to effect suspension of the granular material, transferring the material in suspension upwardly through a laterally confined lift passage, discharging the suspended material from the upper end of the lift pasage into a receiving zone of substantially greater horizontal cross-sectional area than said passage, whereby the contact material upward velocity is rapidly decreased to the point where the contact material falls downwardly within said receiving zone, withdrawing the lift gas from the receiving zone, collecting the descending granular material on the surface of a gravitating bed of granular material near the top of the lift passage, maintaining constantly the level of the bed of granular material not more than about 3 feet below the upper end of the lift passage and withdrawing solid material downwardly from the granular bed.

4. In a process wherein a granular contact material is transferred from a zone at one level to a zone at a second and higher level by passing the contact material, suspended in a suitable carrier gas, upwardly from said first zone as a confined stream, the improvement which comprises: discharging said confined stream upwardly into a confined separation zone of substantially greater horizontal cross-sectional area than said confined stream, whereby the upward velocity of the contact material is rapidly decreased until the contact material begins to fall in said separation chamber, collecting a substantial portion of the contact material on the surface of at least one pile of contact material maintained in said chamber at a level above the level at which the confined stream is discharged into said chamber, withdrawing the carrier gas from the upper portion of said separation zone, and gravitating the contact material downwardly from said pile of contact material in substantially compact columnar form, whereby the particle breakage in the separation step is minimized.

5. An improved method of separating gas from granular solids in the separating zone located about the upper end of a substantially vertical open-ended lift passage comprising: discharging the granular solids suspended in lift gas from the upper end of said lift passage, into said separating zone of substantially greater horizontal cross-section than said lift passage, so that the upward particle velocity is decreased and the particles commence to fall, catching a substantial portion of the granular solids on the surface of a multiplicity of piles of solid material maintained at spaced levels above the upper end of the passage about the inner periphery of said separating zone, withdrawing lift gas free of granular material from the upper portion of said separating zone, gravitating the granular material downwardly from said piles through confined passages, in the form of substantially compacted column, discharging the solids from the bottom of said columns onto the surface of a bed of solids maintained just below said columns in the lower portion of said zone and withdrawing solids in compacted form from the bottom of said zone, whereby the breakage of granular material is minimized.

6. In a process wherein a granular contact material is transferred from a zone at one level to a zone at a second and higher level by passing the contact material, suspended in a suitable carrier gas, upwardly from said first zone as a confined stream, the improvement which comprises: discharging said confined stream upwardly into a confined separation zone of substantially greater horizontal cross-sectional area than said confined stream, whereby the upward velocity of the contact material is rapidly decreased until the contact material begins to fall in said separation zone, collecting a substantial portion of the contact material on the surface of at least one pile of contact material maintained in said separation zone at a level a substantial distance above the bottom of said zone, gravitating the contact material downwardly in substantially compact columnar form to a discharge level in said zone below the level at which said material is introduced into said zone, collecting the contact material on the surface of a bed of the material maintained in the lower portion of the zone, withdrawing contact material from the lower portion of the zone and withdrawing carrier gas from the upper portion of the zone.

7. The method of separating a lift gas and granular contact material in a gas lift which comprises: discharging granular contact material suspended in a carrier gas from the upper end of an upwardly extending lift passage, at a level intermediate the top and bottom of an enlarged separating zone, whereby the upward velocity of the contact material is reduced and the particles commence to fall in said zone, collecting the contact material on a compact pile of the solids maintained in said zone at a level a substantial distance above the bottom thereof, gravitating the contact material downwardly as at least one compact column to a discharge level in the lower portion of said zone, withdrawing carrier gas from the upper portion of said zone and granular contact material from the lower portion of said zone whereby the contact material is separated from the carrier gas with minimum attrition.

8. A settling vessel adapted to separate a granular contact material from a lift gas without excessive particle breakage comprising: a vertical vessel, an upwardly directed gas lift pipe open at its upper end and terminated intermediate the top and bottom of the vessel, means for withdrawing gas from the upper portion of said vessel, at least one horizontal shelf attached to the inner wall of said vessel at an elevation above the upper end of the lift pipe, so as to collect a pile of granular particles thereon discharged from said pile, at least one depending conduit attached to said shelf, so as to provide for the downward gravitation of said contact material from said shelf, said depending conduit terminating at its lower end in the lower portion of the vessel, an orifice plate in the lower end of said depending pipe, designed to maintain the particles in said pipe in compacted form, and means for withdrawing contact material from the bottom of said vessel.

9. A settling vessel adapted to separate a granular contact material from a lift gas without excessive particle breakage, comprising in combination: a vertical vessel, an upwardly-directed gas lift pipe, open at its upper end and terminated intermediate the top and bottom of said vessel, means for withdrawing gas from the upper portion of said vessel, a multiplicity of horizontal shelves attached to the inner wall of said vessel at vertically-spaced elevation above the upper end of said lift pipe, said shelves being in the form of segments of annular rings attached about the inner periphery of said vessel and on alternate sides of said vessel, so as to avoid excessive restriction of the cross-sectional area provided for gas flow in the settling vessel at any one level, a multiplicity of substantially vertical drop pipes attached to said shelves and terminated at their lower ends at a level below the elevation of the upper end of said lift pipe, and a discharge conduit attached to the bottom of said settling vessel.

10. A settling vessel adapted to separate a granular contact material from a lift gas without excessive particle breakage comprising: a vertical vessel, an upwardly extending gas lift pipe open at its upper end and terminated intermediate the top and bottom of the vessel, means for withdrawing gas from the upper portion of said vessel, at least one horizontal shelf attached to the inner wall of said vessel at an elevation a substantial distance above the bottom of said vessel, so as to collect a pile of granular particles thereon discharged from said pipe, at least one depending conduit attached to said shelf, so as to provide for the downward gravitation of said contact material from said shelf, said depending conduit terminating at its lower end in the lower portion of the vessel, an orifice plate in the lower end of said depending pipe, designed to maintain the particles in said pipe in compacted form, and means for withdrawing contact material from the bottom of said vessel, whereby breakage of the contact material in the separator is substantially reduced.

11. In a process wherein a granular contact material is transferred from a zone at one level to a zone at a second and higher level by passing the contact material, suspended in a suitable carrier gas, upwardly from said first zone as a confined stream, the improvement which comprises: discharging said confined stream upwardly into a confined separation zone of substantially greater horizontal cross-sectional area than said confined stream, whereby the upward velocity of the contact material is rapidly decreased until the contact material begins to fall in said separation zone, collecting a substantial portion of the contact material on the surface of the uppermost of a series of at least two vertically spaced piles of contact material maintained in said separation zone, the uppermost of said piles being located above the level at which the confined stream is discharged into said zone and out of the path of the rising contact material, transferring the contact material downwardly from said pile to the next lower pile of contact material, and to any succeeding pile and then to the lower portion of said separation zone, maintaining a bed of contact material in the lower portion of the separation zone and collecting the contact material from the lowermost pile on the surface of said bed of contact material, withdrawing the carrier gas from the upper portion of said separation zone and withdrawing the contact material from the bottom of said separation zone, whereby the particle breakage in the separation zone is minimized.

12. In a pneumatic conveying system, the improved combination which comprises: a vertical vessel, an upwardly extending gas-lift pipe open at its upper end and terminated intermediate the top and bottom of the vessel, means for withdrawing gas from the upper portion of said vessel, means defining a solids retaining shelf extending laterally from the inner wall surface of said vessel at an elevation substantially above the bottom of the vessel and substantially below the top thereof, so as to collect a pile of granular particles thereon discharged from said pipe, said shelf occupying only a portion of the horizontal cross-sectional area of said vessel which is out of line from said lift pipe, at least one depending conduit attached to said shelf, so as to provide for the downward gravitation of at least a substantial portion of said contact material from said shelf, said conduit terminating a spaced distance above the bottom of said vessel, a flow restricting device associated with the lower end of said conduit and means for withdrawing contact material from the bottom of said vessel.

13. In a system circulating granular solids comprising an upright gas-lift conduit through which the granular solids are impelled upwardly by lift gas and an enlarged disengager vessel into which said conduit discharges solids and gas, the improvement which comprises: means for withdrawing gas from the upper portion of said vessel, at least one shelf adapted to retain a bed of said solids thereon supported within said vessel a substantial distance below the top of said vessel but above the discharge outlet of the lift conduit, said shelf having its inner edge spaced outwardly from the projection of the periphery of the lift conduit and substantially out of the path of the rising solids discharging from said conduit and being positioned below the level of maximum rise of the solids in said vessel and in the path of solids fall so as to interrupt the fall of said solids, at least one depending conduit attached to said shelf, so as to provide for downward gravitation of at least a substantial portion of said contact material from said shelf, said conduit terminating on its lower end below the discharge outlet of the lift conduit but above the bottom of said vessel, a flow restricting device adjacent the lower end of said conduit arranged to throttle the solids flow therefrom, and means for withdrawing contact material from the bottom of said vessel.

14. In a process wherein a granular contact material is transferred from a zone at one level to a zone at a second and higher level by passing the contact material, suspended in a suitable carrier gas, upwardly from said first zone as a confined stream, the improvement which comprises: discharging said confined stream upwardly into a confined separation zone of substantially greater horizontal cross-sectional area than said confined stream, whereby the upward velocity of the contact material is rapidly decreased until the contact material begins to fall in said separation zone, collecting a substantial portion of the contact material on the surface of at least one pile of contact material maintained in said zone at a level above the level at which the confined stream is discharged into said zone and out of the path of rising contact material, withdrawing the carrier gas from the upper portion of said separation zone, and gravitating the contact material downwardly from said pile of contact material in substantially compact columnar form, whereby the particle breakage in the separation zone is minimized.

15. In a process wherein a granular contact material is transferred upwardly in suspension in a lift gas as a confined lift stream which discharges upwardly into a separation zone of substantially greater horizontal cross-sectional area than said confined lift stream so that the contact material rises in said zone above its level of discharge from said lift stream and then loses velocity and settles by gravity onto a bed thereof maintained in said separation zone below the level of said lift stream discharge thereinto, the improvement which comprises: catching the contact material as it settles in said separation zone on at least one pile of said contact material supported within said separation zone (substantially out of the path of the rising contact material) at at least one level below the level of maximum contact material rise and above the level of contact material discharge from said lift stream, flowing the contact material downwardly from said pile as a confined substantially compact stream through at least a substantial portion of the distance to said bed below the level of said lift stream discharge and delivering the contact material from said streams onto said bed, withdrawing the contact material from the lower section of said bed and withdrawing the lift gas from the upper section of said separation zone.

16. In a processing system wherein free-flowing, relatively frangible, granular solids are in substantially continuous circulation, comprising movement of the solids downwardly in a continuous stream along a downflow pass, passage of the solids through a zone wherein they participate in the treatment of fluid substances, and elevation of the solids through a confined upflow pass by momentum imparted to them by a fluid flowing vertically through said upflow pass at a velocity great enough to raise the solids in a continuous stream through the upflow pass, whereby the solids after leaving the upflow pass rise to a considerable height above the discharge end of the upflow pass, into an enclosed disengaging zone of greater horizontal cross-section than that of the confined upflow pass, until the momentum imparted to them is dissipated, and would then drop in uninterrupted, free fall to a level below that of the discharge end of the upflow pass and thereby cause significant attrition damage to the solids by their impact, at the velocity developed by them over the extent of their drop, against the bottom of the disengaging zone or solids already on that bottom, the method of effectively reducing the maximum free fall velocity attainable by the descending granular solids by the end of their drop after disengagement from the lift fluid and thereby reducing the possibility of attrition damage by effectively reducing the force of their impact against the disengager bottom or other solids already on it; which method comprises interrupting the fall of the descending disengaged solids at a finite number of spaced apart elevations, at least one of which is above the discharge end of the upflow pass, and allowing solids from each elevation above at least another one of fall in sequence to the lower ones, and to fall from the lowest such elevation to the disengager bottom or other solids already on it, and whereby solids falling from such interruption elevations avoid contact with solids in the space occupied by the stream discharging from the discharge end of the upflow pass.

17. In a processing system wherein free-flowing, relatively frangible, granular solids are in substantially continuous circulation, comprising movement of the solids downwardly in a continuous stream along a downflow pass, and elevation of the solids through a confined upflow pass by momentum imparted to them by a fluid flowing vertically through said upflow pass at a velocity great enough to raise the solids in a continuous stream through the upflow pass, whereby the solids after leaving the upflow pass rise as an outwardly flaring stream to a considerable height above the discharge end of the upflow pass, into an enclosed disengaging zone of greater horizontal cross-section than that of the confined upflow pass, until the momentum imparted to them is dissipated, and would then drop in uninterrupted, free fall to a level below that of the discharge end of the upflow pass and thereby cause significant attrition damage to the solids by their impact, at the velocity developed by them over the extent of their drop, against the bottom of the disengaging zone or solids already on that bottom, the method of effectively reducing the maximum free fall velocity attainable by the falling granular solids by the end of their drop after disengagement from the lift fluid and thereby reducing the possibility of attrition damage by effectively reducing the force of their impact against the disengager bottom or other solids already on it; which method comprises interrupting the fall of the disengaged solids at an elevation above the discharge end of the upflow pass, and allowing solids from such elevation to descend to the disengager bottom or to other solids already on it, said solids descending from such interruption elevation substantially out of contact with solids in said outwardly flaring stream.

18. In a system circulating granular solids comprising an upright gas lift conduit through which solids are impelled upwardly by lift gas and an enlarged disengager vessel into which said conduit discharges solids and gas, the improvement which comprises: means defining a lateral surface for interrupting fall of solids within said disengager vessel and located above the discharge outlet of the conduit, the inner edges of said surface being spaced outwardly from the projection of the periphery of the lift conduit and substantially out of the path of the rising solids discharging from said conduit, said surface being arranged to allow discharge of solids therefrom to a level below.

References Cited in the file of this patent
UNITED STATES PATENTS

| | | |
|---|---|---|
| 2,616,521 | Berg | Nov. 4, 1952 |
| 2,628,188 | Kirkbride | Feb. 10, 1953 |
| 2,646,316 | Kollgaard | July 21, 1953 |
| 2,669,540 | Weinrich | Feb. 16, 1954 |
| 2,672,374 | Norris | Mar. 16, 1954 |
| 2,684,270 | McClure | July 20, 1954 |